US007126691B2

(12) United States Patent
Gat

(10) Patent No.: US 7,126,691 B2
(45) Date of Patent: Oct. 24, 2006

(54) COMMUNICATIONS METHOD AND APPARATUS USING QUANTUM ENTANGLEMENT

(76) Inventor: Erann Gat, 652 Millard Canyon Rd, Altadena, CA (US) 91001

( * ) Notice: Subject to any disclaimer, the term of this patent is extended or adjusted under 35 U.S.C. 154(b) by 664 days.

(21) Appl. No.: 10/336,332

(22) Filed: Jan. 6, 2003

(65) Prior Publication Data

US 2003/0133714 A1 Jul. 17, 2003

Related U.S. Application Data

(60) Provisional application No. 60/355,597, filed on Jan. 6, 2002.

(51) Int. Cl.
*G01B 9/02* (2006.01)
*H04B 10/00* (2006.01)
(52) U.S. Cl. .................. 356/450; 398/152; 398/161; 356/491
(58) Field of Classification Search ............. 356/450, 356/491; 359/154, 156; 398/152, 161
See application file for complete search history.

(56) References Cited

U.S. PATENT DOCUMENTS 6,057,541 A * 5/2000 Steenblik .................. 250/225
6,483,592 B1 * 11/2002 Pedigo ...................... 356/450
2003/0133714 A1 * 7/2003 Gat ............................. 398/140
2004/0250111 A1 * 12/2004 Flusberg et al. ........... 713/200
2005/0100351 A1 * 5/2005 Yuan et al. ................ 398/214
2005/0281561 A1 * 12/2005 Tomaru ..................... 398/161

FOREIGN PATENT DOCUMENTS

GB 2267622 A * 8/1991

OTHER PUBLICATIONS

Sergienko et al. "Quantum cryptography using femtosecond-pulsed parametric down-conversion" Phys. Rev. A 60 No. 4, 2622-2625, 1999.*
Atatuere, Mete et al. "Complementarity and quantum erasure with entangled-photon states" Phys Rev. A 62, 032106, 2000.*
Jennewein, et al. "Quantum cryptography with entangled photons" Physical Review Letters 84 No. 20, 4729-4732, 2000.*

* cited by examiner

*Primary Examiner*—Layla G. Lauchman
*Assistant Examiner*—Patrick Connolly
(74) *Attorney, Agent, or Firm*—Kleinberg & Lerner, LLP

(57) ABSTRACT

A method and apparatus for transmitting information using the phenomenon of quantum entanglement. Two streams of quantum-entangled particles are emitted from a source. Performing a measurement on one of the streams results in the observable destruction of interference on the other stream. Information is transmitted by modulating the performance of the measurement on the first stream, and received by observing the presence or absence of interference in the second stream.

7 Claims, 1 Drawing Sheet

COMMUNICATIONS METHOD AND APPARATUS USING QUANTUM ENTANGLEMENT

Figure 1:
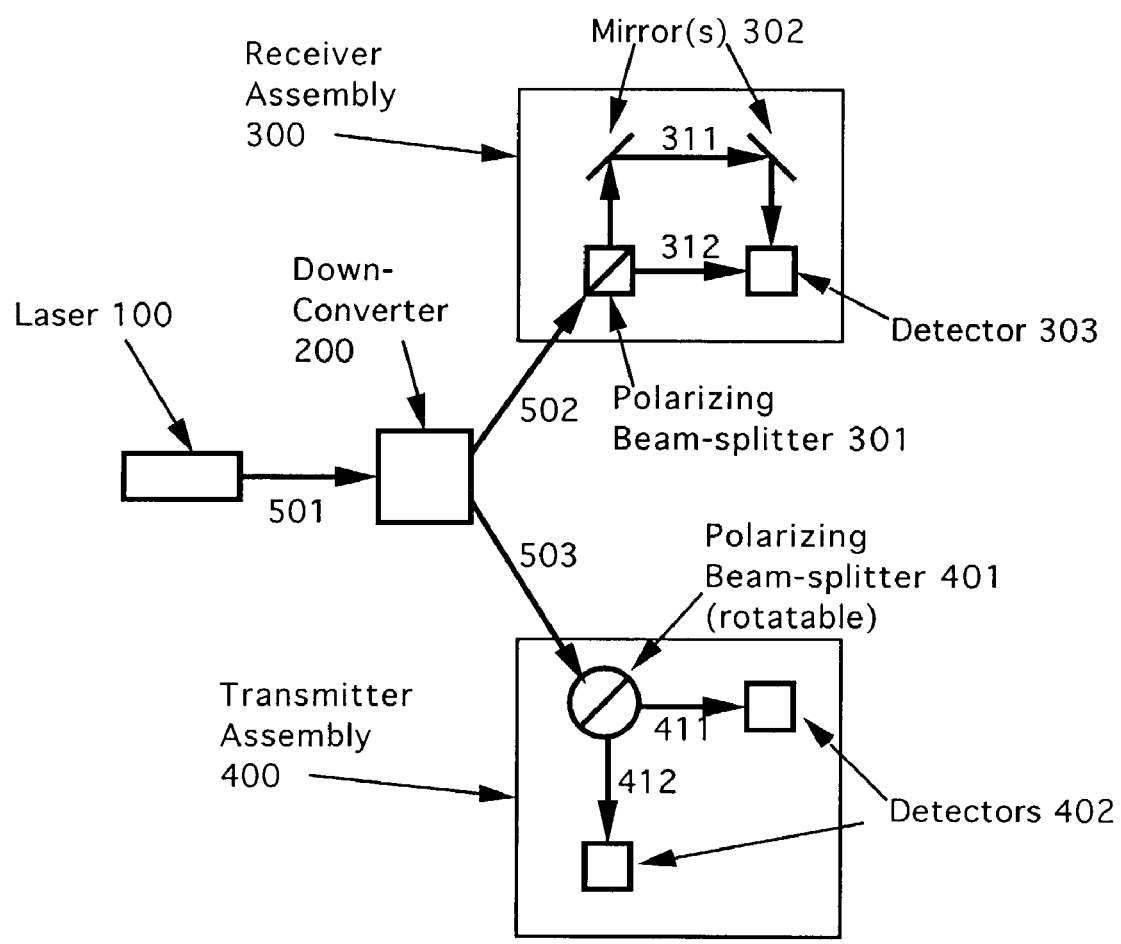

This is a continuation-in-part of a provisional patent application Ser. No. 60/355,597, filed Jan. 6, 2002.

BACKGROUND

This invention uses quantum entanglement to provide a means of communication.

In order to understand this invention it is necessary to first review three basic tenets of quantum theory upon which this invention is based. These are:

1. The Heisenberg uncertainty principle, which states that $$\Delta x \Delta y \geq h$$

where $\Delta x$ and $\Delta y$ are the uncertainty of simultaneous measurements of two complementary quantum state variables x and y, and h is Planck's constant. In other words, the more precisely you measure one of a pair of complementary quantum state variables, the less precisely it is possible to know the other.

The most common example of the Heisenberg uncertainty principle involves the complementary state variables of position and momentum. If you know a particle's position then you can't know it's momentum, and vice versa. In the present invention we will use a different example: polarization of a photon along two axes that are perpendicular to each other and to the direction of travel of the photon. We will refer to these two axes as H and V for horizontal and vertical, but there is no requirement that these axes have any particular absolute orientation, only that they be at right angles to each other. The Heisenberg uncertainty principle for photon polarization states that if you know the photon's polarization along the H axis then you can't know it for the V axis, and vice versa.

2. The principle of quantum superposition and interference. Particles can exist in multiple quantum states simultaneously, a phenomenon known as quantum superposition. Quantum superposition manifests itself as interference, and consequently demonstrates the wave-like properties of quantum particles.

The most common example of quantum superposition is the well known two-slit experiment first performed by Thomas Young in the early 1800's. A laser illuminates a screen in which two narrow closely-spaced slits have been cut. The light that passes through the slits falls upon a second screen. The result is not two spots of light as one might expect, but an interference pattern consisting of a large number of light and dark stripes, demonstrating the wave-like nature of light.

To this point the experiment is purely classical. If one observes the screen closely with appropriate instrumentation one observes that the illumination of the screen is not constant, but in fact consists of a large number of individual "points" of light (photons) that accumulate and generate the interference pattern over time. If the intensity of the laser beam is low enough it is possible to observe and count individual photons arriving at the screen.

The crucial and startling crux of quantum superposition is this: if any attempt is made to measure which slit an individual photon passed through on the way to the screen then the interference pattern vanishes and is replaced by two spots of light, one behind each slit. This is an easily observed macroscopic effect, and requires no special equipment to reproduce. A laser pointer, some 3×5 index cards, and two pairs of polarized sunglasses suffice. The explanation of this phenomenon according to quantum theory is that the interference is the result of the photons existing in a quantum superposition, being simultaneously at both slits. The photon thus interferes with itself according to wave mechanics. If the actual position of the photon is measured then it no longer exists in a quantum superposition; its state is strictly at one slit or the other. Since the photon is no longer at both slits simultaneously it can no longer interfere with itself.

Note that it is generally not possible to determine whether a given photon has or has not interfered with itself. Interference is an aggregate phenomenon, becoming apparent only when a very large number of particles have arrived at the screen. It is possible to compute precisely how many particles must be observed before one can conclude with confidence that interference is or is not taking place, but the details depend very much on the specific configuration of the experiment. The salient point for the purpose of the present invention is simply that such calculations are possible, and the methods for making those calculations are well known to those skilled in the art.

3. Quantum entanglement. This is arguably the most mysterious of quantum phenomena. It was originally proposed by Einstein, Podolsky and Rosen in the 1935 as a proof that quantum theory must be wrong. In 1965 John Bell proposed a method for testing the idea experimentally. The experiment was actually carried out by Alain Aspect in 1981, with the results showing that Einstein was wrong and entanglement actually does occur. Since then this result has been confirmed by numerous experiments, and is at the heart of the field of quantum computing.

The crux of entanglement is this: it is possible to produce pairs of particles such that measurements of certain of their properties always come out with the same result. On its face this is not such a startling claim. For macroscopic objects it is wholly unremarkable. Consider for example a factory that makes widgets in two colors: red and blue, and in two sizes, large and small, and come in packages of two. Whenever we open a package we find that the widgets are always the same color and the same size. Nothing mysterious here.

To extend the widget analogy to the quantum world we have to imagine that the widgets are extremely fragile, and they disintegrate immediately upon exposure to light. If we want to measure the color or size of one of these exquisitely fragile widgets we have to use special equipment. Furthermore (and this is where is starts to get weird) the color and size of the widgets can change according to the following rules: when you measure the size of a widget, its color can change, and vice versa. So any number of measurements of the size of a widget will yield the same result, but if you then measure the widget's color, and then measure its size again you may (or may not) find that its size has changed from large to small, or vice versa. Likewise, once you measure its size and then go back to measuring color you will find that it's color may have changed from blue to red or vice versa.

It sounds very odd, but this is an accurate description of the behavior of quantum particles. Color and size are analogous to a pair of complementary or orthogonal state variables subject to the Heisenberg uncertainty principle like position and momentum, or polarization along horizontal and vertical axes. When you measure, say, size, then color becomes uncertain. In fact, after a size measurement the quantum widget exists in a quantum superposition of both colors simultaneously, and likewise after a color measurement the widget is simultaneously large and small. Furthermore, and this is crucial to the present invention, because the widget (or particle) is in a quantum superposition of states it will interfere with itself under suitable conditions.

It is now possible to see why entanglement is such a mysterious phenomenon. Until a measurement is actually made the particles exist in a quantum superposition. They don't really have a particular size or color; they are simultaneously both red and blue, both large and small. It is only when a measurement is made that the widget/particle somehow "decides" which size or color to become. And somehow, in a way that is not understood, for a pair of entangled particles, when one member of the pair makes such a decision, its counterpart will simultaneously make the same decision at the same time even if the two particles are far apart. (Einstein called this "spooky action at a distance", and it was his main objection to quantum theory. This "spooky action at a distance" is real, and it has already found application in cryptography, where it is used for the secure distribution of keys.)

It is tempting to try to use this phenomenon to communicate information, but it is not as straightforward as it might seem. In fact, it can be proven that it is impossible to communicate information using quantum entanglement of a single pair of particles. It is tempting to conclude that it is therefore impossible to communicate information using quantum entanglement using more than one particle since if a single particle communicates zero information then N particles could only communicate N times zero information, which is to say, zero information. But, as the present invention will show, this is not the case. The proof of impossibility has a loophole.

To understand the loophole it is necessary to summarize the proof. If you make a measurement on a particle that is a member of an entangled pair then you gain information about its counterpart. In particular, you know what the result of a particular measurement will be (or was). But no information has actually been transmitted between the two particles. It is possible to prove this in a mathematically rigorous way, and the result extends to multiple particles as well.

But (and this is the loophole) making a measurement is not the only thing you can do to a particle. Rather than make a measurement, you can arrange for the particle to interfere with itself instead. For a single particle this also yields no useful information, since a single particle is not enough to reveal the presence or absence of interference. But with multiple particles it is possible to transmit information using quantum entanglement together with interference.

We now proceed to describe how this is done.

SUMMARY OF THE INVENTION

The present invention is conveniently constructed from optical components using photons as the entangled particles, but it can be constructed using any sort of quantum entangled particles, including electrons, protons, neutrons, and even whole atoms and molecules.

The first element of the invention is a source of quantum-entangled particle pairs. Such pairs of photons can be produced by illuminating certain kinds of crystals with a laser beam using methods well known to those skilled in the art of quantum optics. For purposes of illustration we will assume that the entangled state variable is polarization. The source of entangled particles is configured in such a way that particle pairs are emitted as two beams. Each particle in one beam has an entangled counterpart in the other beam.

The second element of the invention is an interferometer, a device for producing interference from a stream of particles when that stream exists in a quantum superposition of states. An example of such a device for polarized photons is called a Mach-Zender interferometer, which uses a polarizing beam splitter to change a superposition of polarization states into a superposition of spatial states. These spatial states are then recombined by a suitable arrangement of mirrors or other optical devices to generate interference. Again, the operation of this device is well know to those skilled in the art.

The final element of the invention is a detector, a device for making a measurement on the complementary state variable to the one used by the interferometer. In the case of polarized photons this would consist of a polarizing beam splitter like the one used in the Mach-Zender interferometer. Again this beam splitter separates the polarization states into spatial states, but instead of being recombined, the photons are instead sent to detectors which absorb them and record their arrival. (These detectors do not have to be sophisticated. Any non-reflective material will suffice.)

The polarizing beam splitter in the detector is arranged so that it can be oriented either in parallel to the one in the interferometer, or at a 45 degree angle. Information is transmitted by changing the orientation of the polarizing beam splitter in the detector back and forth between the parallel and 45-degree configurations. Information is received by observing the presence or absence of interference in the interferometer. Note that contrary to intuition, what we have called the detector is actually the transmitter. The interferometer is the receiver.

When the polarizing beam splitter in the detector is oriented in parallel with the beam splitter in the interferometer then there is no interference because the positions of the particles are being measured. The particles therefore do not exist in a quantum superposition of states and therefore do not interfere.

When the beam splitter in the detector is oriented at 45 degrees to the beam splitter in the interferometer then there is interference. This is because polarization along two axes at 45 degrees to one another are complementary quantum state variables subject to the Heisenberg uncertainty principle. Thus, making a measurement along the 45 degree axis causes the photons to exist in a quantum superposition along the parallel axes, and therefore to produce interference in the interferometer.

There are numerous ways to use this device to transmit information. The simplest method uses a binary code. For example, information could be transmitted in Morse code, or using a more modern binary communications protocol. The presence of interference at the receiver is taken to be a binary '1' and its absence is taken to be a binary '0' (or vice versa). One can also transmit analog information directly by rotating the polarizing beam splitter in the detector/transmitter to angles between 0 and 45 degrees, and measuring the resulting partial interference in the interferometer. However, the signal transmitted by this device is inherently noisy even under ideal conditions. It is probably easier to control the noise using a digital communications protocol than an analog one.

The communications capacity of the device depends on the brightness of the source of entangled particles. The brighter the source, the higher the capacity. In general, a certain minimum number of particles must be received at the interferometer in order to register a single bit of information at a desired maximum error rate. What this number is depends on the quality and precision of the components being used. Whatever it is, the time required to accumulate this number of particles can be reduced (and the capacity of the channel thereby increased) by increasing the brightness of the particle source.

It is to be understood that the preceding description is intended to be illustrative rather than restrictive. It is not necessary to use photons, polarizing beam splitters, or any optical components. The same results can be achieved using any source of quantum-entangled particles, be they photons, electrons, protons, neutrons, and even whole atoms, molecules, or Bose-Einstein condensates. The only essential elements are a source of such particles arranged to produce two beams, means of producing interference on one beam, and a means of making measurements on the entangled state variable and its complement on the other beam.

DETAILED DESCRIPTION

FIG. 1 is a depiction of one possible embodiment of the invention.

A laser 100 emits a laser beam 501 which illuminates a down-converter 200. The down-converter in turn emits two beams of entangled pairs of photons 502 and 503. One of the two photon beams is directed towards a transmitter assembly 400. The other beam is directed towards a receiver assembly 300. The configurations of the transmitter and receiver assemblies constitute the innovative portions of the invention. These will now be described in turn.

The receiver assembly comprises a polarizing beam splitter 301 which splits the incoming photon beam 502 into two beams 311 and 312. A suitable arrangement of mirrors 302 cause these separated beams 311 and 312 to be recombined at a detector 303 in such a manner as to detect the presence or absence of interference at the detector. This arrangement of components is commonly used in the practice of quantum optics, where this device is known as a Mach-Zender interferometer.

The transmitter assembly comprises a second polarizing beam splitter 401 mounted in a way that allows it polarization axis to be rotated. The means of rotating PBS 401 can be a simple mechanical gimbal, or a sophisticated arrangement of electronically actuated optical components. The latter can be expected to provide faster actuation rates and therefore higher communications bandwidth, but is not otherwise necessary to the operation of the invention. Simply holding the PBS in one's hand and rotating it will suffice.

PBS 401 splits the second photon beam from the down converter 503 into two beams 411 and 412. Unlike the receiver, the beams are not recombined but are instead directed to two separate detectors 402. The purpose of detectors 402 is simply to absorb the photons and insure that their quantum wave functions have collapsed. The output of the detectors is not used. The detectors can therefore be very simple devices. Nothing more than a piece of material that absorbs photons of the appropriate wavelength is needed. A piece of cardboard painted matte black will suffice.

We will now describe the operation of the device. For purposes of illustration we will describe one possible method for transmitting a binary code. It will be recognized that this suffices to provide a general-purpose digital communications capability. However, the method about to be described is not the only way of using the device to transmit a binary code. Many alternate schemes will be readily apparent to those skilled in the art. Furthermore it will be apparent that the device is not constrained to transmit binary information, but can be used to transmit analog information as well.

To transmit a binary "1" PBS 401 is rotated so that its polarizing axis is parallel to the polarizing axis of PBS 301. Let us refer to this axis as X. Both PBS's therefore separate photons according to their polarization along X. The detectors 402 in the transmitter therefore measure the polarizations of the photons in beam 503. Because the photons in beam 502 are entangled with the photons in beam 503, the detectors 402 are also effectively measuring the polarizations of those photons (the ones in beam 503) with respect to the X axis as well. Because the polarizations of the photons in beam 503 are now known their positions after passing through PBS 301 (whether they are in beam 311 or 312) are also known. Therefore, by the laws of quantum mechanics, no interference will be observed at detector 303.

Now to transmit a binary "0" PBS 401 is rotated 45 degrees in either direction. The polarizing axis of PBS 401 is now oriented at 45 degrees with respect to the X axis. Let us call this new axis of orientation R. Because X and R are at 45 degrees to one another, polarization states along these two axes form a pair of complementary quantum state variable subject to the Heisenberg uncertainty principle. The positions of the photons in the transmitter are being measured as before, but now what is being measured is polarization with respect to the R axis. Polarization with respect to the X axis is thereby rendered uncertain, and the photons must therefore be in a quantum superposition of polarization states with respect to the X axis.

At this point the photons in the receiver beam 502, because they are entangled with the photons in the transmitter beam 503, must also be in a quantum superposition of polarization states with respect to the X axis. As a result, after passing through PBS 301 these photons travel along both optical paths 301 and 302 simultaneously. This produces observable interference at detector 303 after the accumulation of sufficient photons. It is the observation of this interference that constitutes the reception of a binary "0".

It will be recognized that there are many variations on the particular arrangement described above. The sense of the signal can be reversed, that is, the presence of interference can be taken to signify a binary "1" instead of a binary "0" and vice versa. Different pairs of complementary state variables can be used. For example, instead of complementary polarization states one could use position and momentum of photons using a pair of simple two-slit experiments, which are well known to those skilled in the art. Particles other than photons could be used. For example, the invention can be realized using pairs of entangled electrons, taking the spin state of those electrons as the quantum state variable, and using a Stern-Gerlach apparatus instead of a polarizing beam splitter. Innumerable variations are possible.

It is also possible to transmit analog information by rotating PBS 401 to intermediate angles between 0 and 45 degrees, although the difficulty in calibrating the device for this purpose will probably outweigh any advantage one might obtain.

I claim:

1. Communications apparatus comprising:
A) means for generating pairs of particles that are quantum mechanically entangled with respect to a quantum state variable, said particle pairs being arranged as a first beam of particles and a second beam of particles, where every particle in said first beam of particles has its quantum entangled counterpart in said second beam of particles (and vice versa), B) a receiver comprising
  1) means for separating the particles in said first beam of particles into a third beam of particles and a fourth beam of particles according to the value of said quantum mechanical state variable,
  2) means for recombining said third and fourth beam of particles in such a manner as to generate quantum interference, and
  3) means for detecting the presence or absence of quantum interference in said recombining means, and
C) a transmitter comprising
  1) means for separating the particles in said second beam of particles that is capable of separating the particles either according to the value of said quantum state variable or according to the value of the quantum state variable that is orthogonal to said quantum state variable, the mode of separation being selectable at the time when the invention is in operation,
  2) means for selecting said mode of separation of said separating means, and
  3) means for absorbing the particles emitted by said separating means.

2. The communications apparatus of claim 1 where said means for generating particle pairs comprise a laser and a down-converter.

3. The communications apparatus of claim 1 where any of said separating means comprise a polarizing beam splitter.

4. The communications apparatus of claim 1 where the receiver comprises a Mach-Zender interferometer.

5. The communications apparatus of claim 1 where all the particle beams are beams of electrons and said separating means comprise a Stem-Gerlach apparatus.

6. A method of communication using the apparatus of claim 1 where information is transmitted by selecting the mode of operation of said separating means in the transmitter.

7. The communications apparatus of claim 1 where all the particle beams are beams of photons.

* * * * *